United States Patent [19]

Yamada

[11] Patent Number: 5,282,064
[45] Date of Patent: Jan. 25, 1994

[54] APPARATUS FOR SIMULTANEOUS READING OF REFLECTIVE AND LIGHT CONDUCTIVE PORTIONS OF AN ORIGINAL

[75] Inventor: Masanori Yamada, Kawasaki, Japan

[73] Assignee: Canon Kabushiki Kaisha, Tokyo, Japan

[21] Appl. No.: 921,963

[22] Filed: Aug. 4, 1992

Related U.S. Application Data

[63] Continuation of Ser. No. 575,878, Aug. 31, 1990, abandoned.

[30] Foreign Application Priority Data

Aug. 31, 1989 [JP] Japan ................... 1-225379

[51] Int. Cl.$^5$ ............................... H04N 1/04
[52] U.S. Cl. ...................... 358/487; 358/488
[58] Field of Search ............. 355/68, 70; 358/474, 358/483, 484, 487, 488, 494, 497

[56] References Cited

U.S. PATENT DOCUMENTS

| | | | |
|---|---|---|---|
| 4,451,854 | 5/1984 | Daigo | 358/488 |
| 4,568,984 | 2/1986 | Juergensen et al. | 358/484 |
| 4,574,316 | 3/1986 | Wilman et al. | 358/494 |
| 4,658,301 | 4/1987 | Toyoda et al. | 358/494 |
| 4,802,229 | 1/1989 | Yamada | 358/443 |
| 4,816,866 | 3/1989 | Yamada | 355/243 |
| 4,847,662 | 7/1989 | Yamada | 355/55 |
| 4,899,227 | 2/1990 | Yamada | 358/452 |
| 4,905,095 | 2/1990 | Yamada | 358/451 |
| 4,965,678 | 10/1990 | Yamada | 358/452 |
| 4,989,099 | 1/1991 | Koshiyouji et al. | 358/487 |

*Primary Examiner*—Leo H. Boudreau
*Assistant Examiner*—Larry J. Prikockis
*Attorney, Agent, or Firm*—Fitzpatrick, Cella, Harper & Scinto

[57] ABSTRACT

An original is placed on an original support of an original-reading apparatus. A reflecting original is exposed to a first light source. A light conductive original is exposed to a second light source. The light image reflected from the reflecting original and the light image passing through the light conductive original are read optoelectrically by a reading device which outputs image signals representative of the light images. The positions of reflecting original and the light conductive original are detected by a detecting device which outputs position detection signals. A control device controls the original-reading operation of the reading device in accordance with the position detection signal.

18 Claims, 10 Drawing Sheets

APPARATUS FOR SIMULTANEOUS READING OF REFLECTIVE AND LIGHT CONDUCTIVE PORTIONS OF AN ORIGINAL

This application is a continuation of prior U.S. patent application Ser. No. 07/575,878 filed Aug. 31, 1990, now abandoned.

BACKGROUND OF THE INVENTION

1. Field of the Invention

The present invention relates to an original-reading apparatus used in copy machines and facsimile etc., and more particularly to an original-reading apparatus capable of reading light conductive originals.

2. Related Background Art

Figure 1:
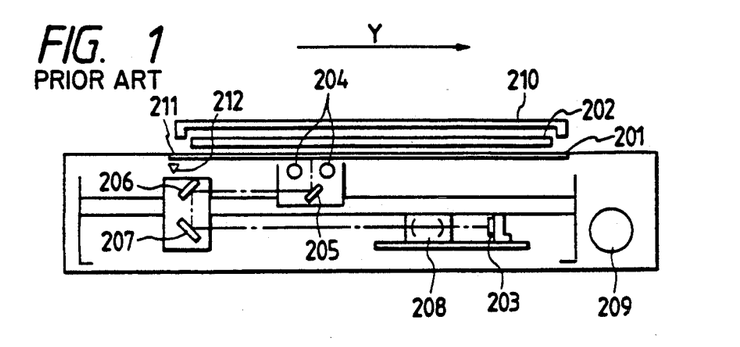
FIGS. 1 and 2 are schematic views of prior art original-reading apparatuses.

FIG. 1 shows a general construction of an original-reading apparatus used in a conventional copy machine or the like.

In FIG. 1, an original support 201 is made of transparent glass. A retainer 202 is mounted on an original-retaining cover 210. An image-reading CCD 203 is constructed of a plurality of light-receiving elements aligned in a line.

A motor 209 drives a lamp 204 and mirrors 205-207 into movement in a Y direction, perpendicular to the direction (main scan direction) in which the light-receiving elements of CCD 203 are disposed, so as to subscan the original in the Y direction. The reflecting original such as a book placed on the original support 201 is exposed to the light from an original-exposing lamp 204. The light reflected from the original is received by the CCD 203 to form an image of the original thereon. In this manner, the image of original is read in photoelectric way from the original by means of the CCD 203 for each of scan lines. A sensor 212 detects that an optical system formed of the lamp 204 and mirror 205 is at their home positions (HP), with respect to which the optical system performs the subscan over a predetermined distance.

The original-reading apparatus shown in FIG. 1 suffers from the problem that light conductive originals such as a 35 mm film cannot be read. An apparatus shown in FIG. 2 may be considered to solve the problem. Elements 201-209, 211, and 212 are of the same structural elements as in FIG. 1.

Figure 2:
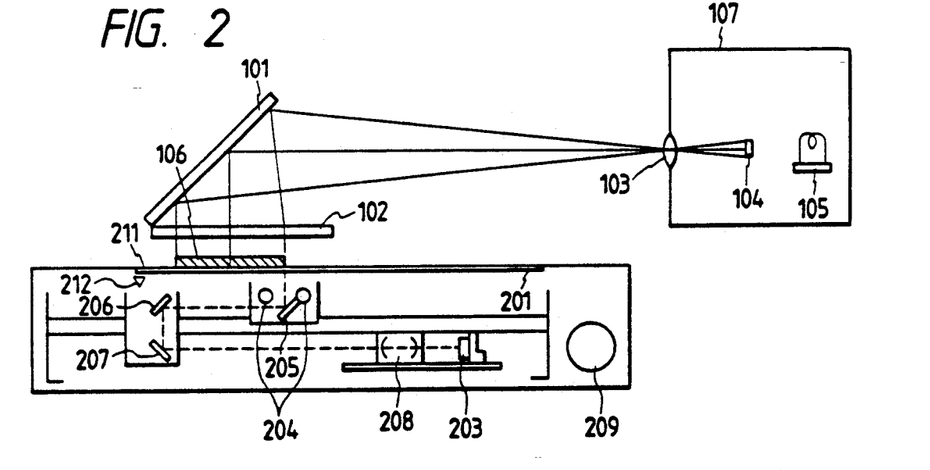

A film, which serves as the light conductive original, is loaded in position within a projector 107. The film 104 is exposed to the light from a lamp 105. Then, the light through the film 104 passes through a lens 103, is reflected by a reflecting mirror 101, then passes through a Fresnel lens 102, and is then projected as a projection image 106 onto the original support 201. The projection image 106 is adjusted its focus by means of the lens 103. The lamps 105 and 204 are controlled to turn on and off by a later described CPU.

When reading the image of the film 104, with the lamp 204 turned on and the lamp 105 turned off, the optical system performs the subscan to read the image 106. This procedure is taken if the light conductive originals are 35 mm negative films and reversal films etc. For light conductive originals such as OHP films (overhead projector) of eight by ten inches, A4 size, or a large size negative films of four by five inches, the film 104 is not loaded into the projector 107 but is placed between the Fresnel lens 102 and the original support 201. The similar image-reading procedure is carried out for the film 104 by utilizing, as a backlight, the light provided by the lamp 105 and lens 103 of the projector 107, mirror 101, and Fresnel lens 102.

Figure 3:
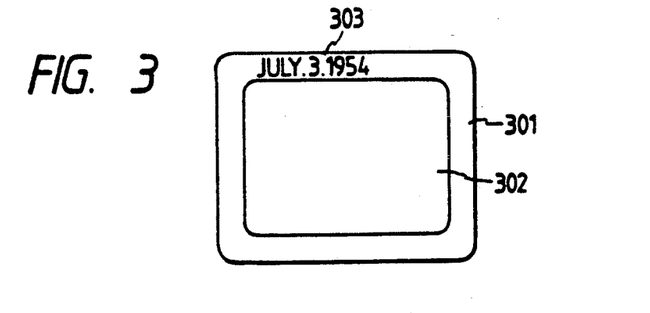
FIG. 3 is a diagram showing a frame-mounted OHP film.

However, as shown in FIG. 3, the OHP film originals are often mounted on a frame 301 made of, for example, pasteboard. Reading images from such frame-mounted OHP film originals suffers from the following problems.

Since the frame 301 is not light conductive, simultaneously reading both the image and the information 303 written on the frame 301 is not possible; nor is accurate reading of only the film surface 302 on the inside of the frame 301 possible.

SUMMARY OF THE INVENTION

The present invention was made to solve the aforementioned drawbacks. An object of the invention is to provide an original-reading apparatus capable of reading not only the reflecting originals such as books and documents but also light conductive originals such as films.

Another object of the invention is to provide an original-reading apparatus which reads the originals by detecting the positions of both the reflecting originals and the light conductive originals to be read.

Still another object of the invention is to provide an original-reading apparatus which determines the positions of the pasteboards and the positions of the light conductive portion of the frame-mounted light conductive originals, such as frame-mounted OHP films, so as to ensure the reading operation of not only the information on the light conductive portion but also the information on the pasteboard portion.

An original is placed on an original support of an original-reading apparatus. A reflecting original is exposed to a first light source. A light conductive original is exposed to a second light source. The light image reflected from the reflecting original and the light image passing through the light conductive original are read optoelectrically by a reading device which outputs image signals representative of the light images. The positions of reflecting original and the light conductive original are detected by a detecting device which outputs position detection signals. A control device controls the original-reading operation of the reading device in accordance with the position detection signal.

BRIEF DESCRIPTION OF THE DRAWINGS

Features and other objects of the present invention will be more apparent from the description of the preferred embodiments with respect to the accompanying drawings in which:

FIGS. 8-1 to 8-3 are illustrative diagram showing how the position of an original is detected;

FIGS. 11-1 to 11-3 are diagrams of steps of detecting the original; and

DESCRIPTION OF THE PREFERRED EMBODIMENTS

Figure 4:
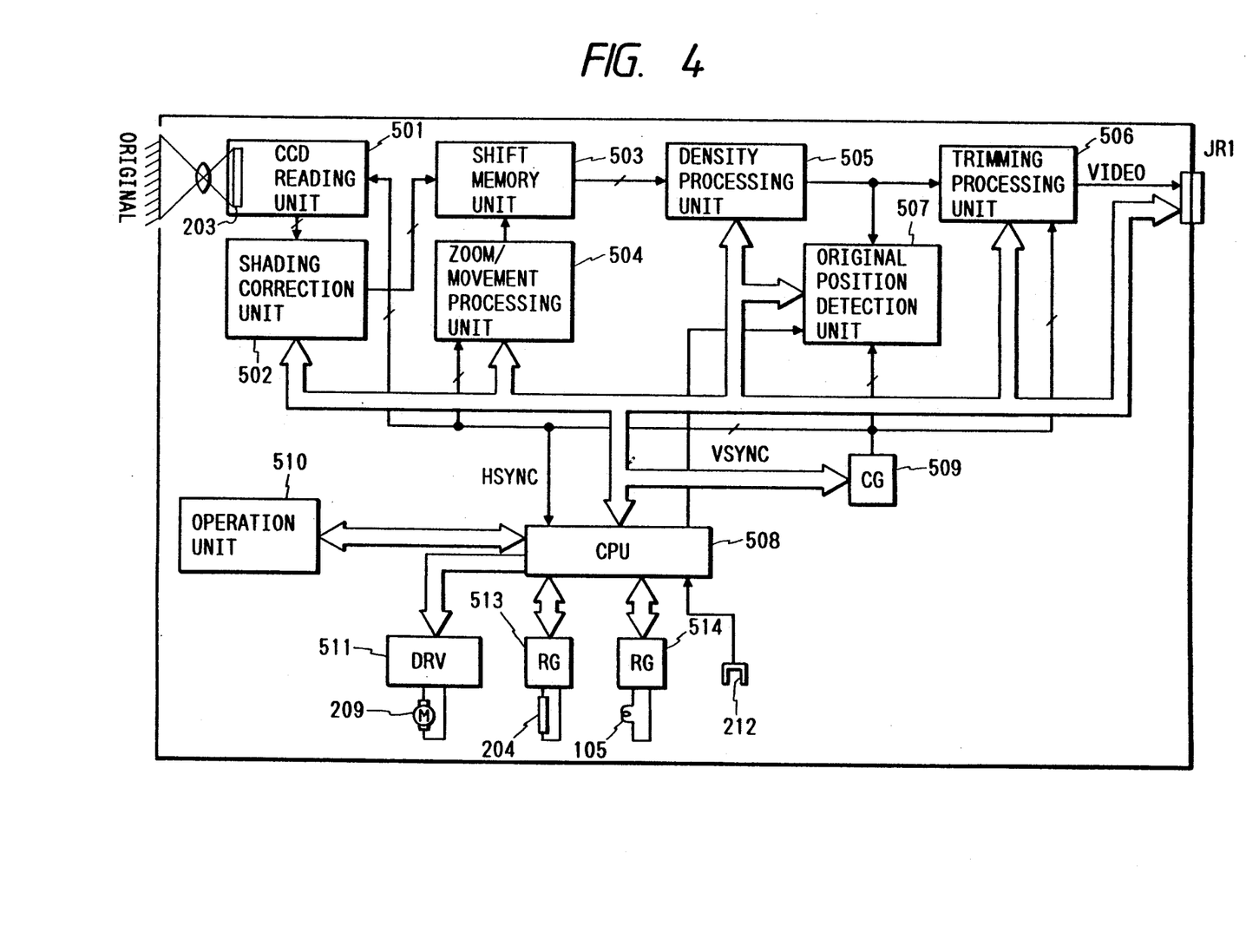
FIG. 4 is a block diagram of an original-reading apparatus according to the present invention.

FIG. 4 is a block diagram showing an original-reading apparatus according to the present invention. The structural arrangement of FIG. 4 is the same as that of FIG. 2.

A CCD reading unit 501 incorporates a CCD 203, clock driver of the CCD 203, amplifier that amplifies the signals from the CCD 203, and A/D converter for converting the amplified signal into a digital signal. The CCD reading unit 501 outputs an image data converted into a digital signal of M bits to a shading correction unit 502.

The image signal undergoes the detection and correction of shading amount of the light source and the lens etc. and is then temporarily stored into a shift memory 503. The shift memory 503 has two memories for two lines, so that when the image data for the Nth line is being written into one of the memories, the data for the (N−1)th line is being read out from the other. The shift memory 503 further includes a line address counter for writing the image data into the shift memory, a read address counter for reading the image data from the shift memory, and an address selector circuit for switching between addresses from these two counters.

A variable magnification/movement processing unit 504 changes the magnification of the original and causes the optical system to move in the main scan direction by varying the clocks by which the image signal is written into the shift memory and the clocks and timings by which the image signal is read from the shift memory.

The image signal outputted from the shift memory 503 is supplied to a density processing unit 505, where the image signal undergoes binarization processing and dither processing so as to be converted into a binary signal and is then outputted to a trimming processing unit 506. The trimming processing unit 506 converts an arbitrary segment of the image data into "0s" or "1s" for every main scan cycle, thereby editing an image.

The signal outputted from the density processing unit 505 is also inputted into an original-position detecting unit 507 by which the coordinates of position of the original placed on the original support 201 is extracted from the image signal.

A CPU unit 508 is constructed of a CPU, ROM, RAM, timer circuit, and I/O interface. The CPU unit 508 controls an operation unit 510 disposed above the main body of the original-reading apparatus so as to control the apparatus in accordance with commands from an operator.

A motor driver 511 drives a motor which moves an optical system in accordance with the speed and time which are commanded through the CPU unit 508.

Lamp regulators 513 and 514 supply power at a voltage specified by the CPU 508 to original-exposing lamps 204 and 105.

A sensor 212 detects the home position of the optical system. A clock generator 509 produces transfer clocks for the CCD 203, read/write clocks, vertical sync signal (VSYNC), and horizontal sync signal (HSYNC) etc.

An image signal VIDEO, which is obtained by reading the original image, is supplied via a connector JR1 to external devices such as printers, a host computer, and memories.

Figure 5:
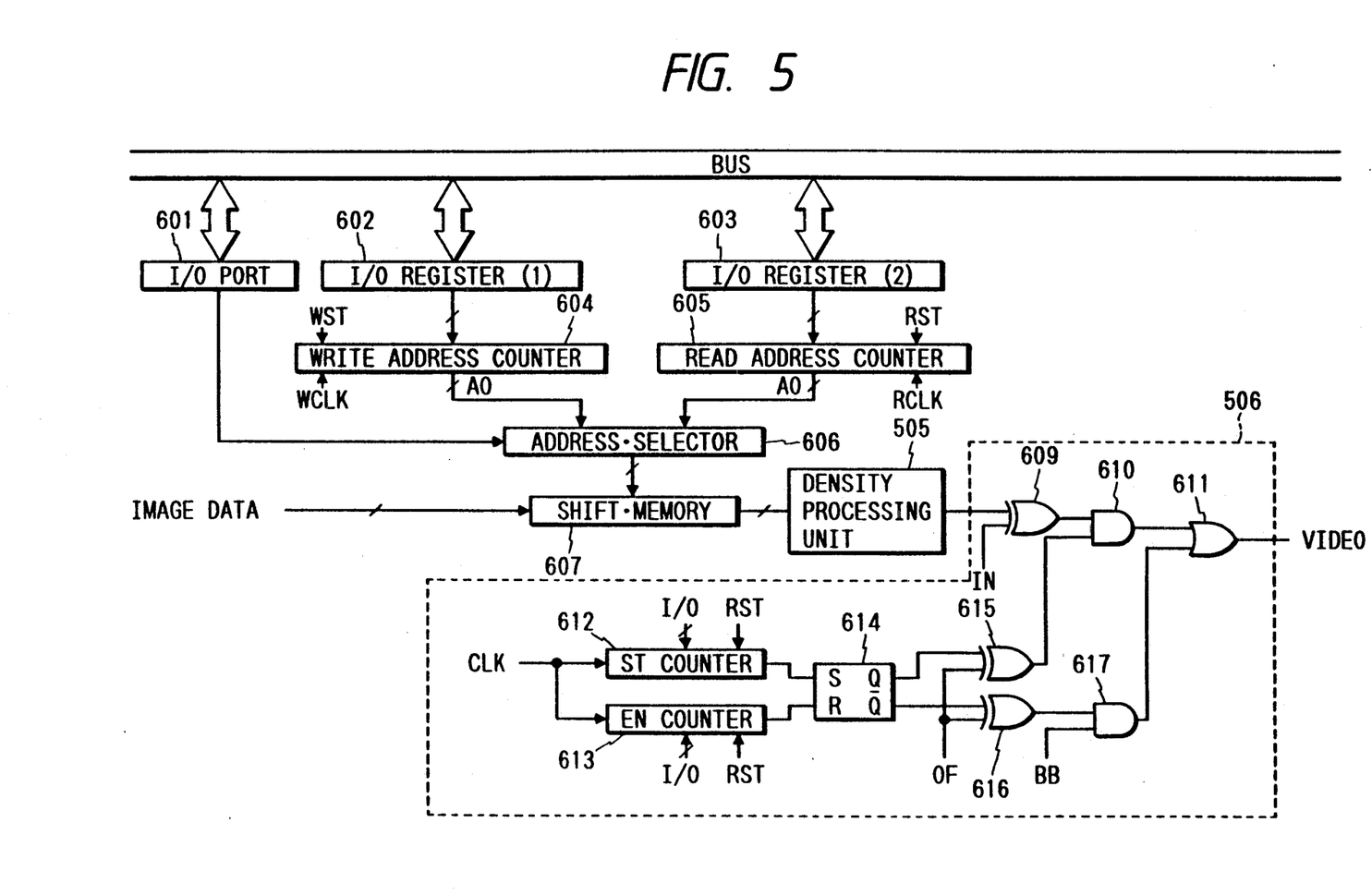
FIG. 5 is a circuit diagram showing a shift memory unit.

FIG. 5 shows a circuit diagram of the shift memory unit 503. A write address counter 604 is an address counter used for writing data into a shift memory 607. A read address counter 605 is an address counter used for reading the data from the shift memory 607. An address selector 606 receives commands from the CPU unit 508 via an I/O port 601 to select either the address signal from the write address counter 604 or the address signal from the read address counter 605 so as to address the shift memory 607.

I/O registers 602 and 603 are registers by which the CPU unit 508 loads preset values to the write address counter 604 and the read address counter 605, respectively.

The write address counter 604 and read address counter 605 are each a down counter. The counters 604 and 605 receive a WST signal and an RST signal, respectively, for commanding the initiation of counting operations thereof. The counters 604 and 605 receives a write clock WCLK for writing the image data into the shift memory 607 and a read clock RCLK for reading the image data from the shift memory 607, respectively.

EX-OR gates 615 and 616 receive a signal OF to select image area: if OF is 1, the area inside the frame specified by both an ST counter 612 and an En counter 613 is masked; if OF is 0, then the area outside the frame specified by both the counters 612 and 613 is masked.

The image data outputted from the shift memory 607 is supplied to the density processing unit 505 which converts the image data into a digital signal. The output of the density processing unit 505 passes through an EX-OR gate 609 and is then gated by an AND gate 610. An AND gate 617 decides in accordance with a signal BB whether the aforementioned masked portion of image is outputted as black or white; black for BB=1, white for BB=0.

An OR gate 611 outputs VIDEO, which is the image output received from the gates 610 and 617. The EX-OR gate 609 controls the inversion of the image signal, i.e., black portion to white and white portion to black in accordance with a signal IN; not inverted if IN=1 and inverted if IN=0. The CPU unit 508 outputs the signal IN of either 1 or 0 depending on the mode specified by the operator.

The ST counter 612 and EN counter 613 are START BIT COUNTER and END BIT COUNTER, respectively, which cooperate to output an image into a predetermined area. These counters are preset their gate count data by the CPU unit 508 through I/O. A flip flop 614 is set when the ST counter 612 has counted up and is reset when the EN counter 613 has counted up.

For example, if the OF signal is 1, then when the ST counter 612 has counted up so that the output Q of the flip flop 614 reaches 1, the output of the gate 615 turns zero to shut off the output of the gate 610 until the EN counter 613 counts up, thereby masking the image. During which the output of the gate 610 is 1, therefore the gate 617 outputs 1; the masking being black if the BB=1, and white if BB=0.

In the mean time, if the OF signal is 0, when the ST counter 612 has counted up so that the output Q of the flip flop 614 reaches 1, the outputs of gates 615 and 616 are 1 and 0, respectively; the outside of trimming portion turning to black if BB=1, and to white if BB=0.

The original position detecting unit 507, which detects the coordinates of the original, will now be described with reference to FIG. 6. FIG. 7 shows the original placed on the original support 201.

A main scan counter 451 is a down counter which indicates the scan position in one line of the main scan. The counter 451 is set to its maximum value of the direction (X) of main scan upon the horizontal synchronizing signal HSYNC and counts down by one every time an image data clock CLK is inputted. A subscan counter 452 is an up counter, which is reset to 0 at the rising edge of VSYNC (indicative of the forward edge of image) and counts up upon the HSYNC signal so as to indicate the position of scan in the direction of subscan.

The image data VIDEO, which is binarized by prescan performed prior to the reading operation of the original, is inputted into the shift register 401 at a rate of eight bits at a time. Upon completion of inputting operation of eight bits, a gate 402 makes a decision whether or not all of the eight bits are white; if YES, the gate 402 outputs 1 onto the signal line 403. When the first eight-bits-white appears after the original-reading operation has started, a flip flop 404 is set by the gate 402 and remains set until the next VSYNC is supplied thereto. The flip flop 404 has been reset in advance by VSYNC. When the flip flop 404 is set, a latch 405 is loaded the content of the main scan counter 451 at that time, which represents the value of X1 coordinate. The latch 406 is loaded with the content of the subscan counter 452 at that time, which represents the value of Y1 coordinate. The values of X1 and Y1 determine the value of P1(X1, Y1).

Every time the gate 402 outputs 1 onto the signal line 403, the content of the main scan counter 451 is loaded into the latch 407. When the first eight-bits-white appears and the content of the main scan counter 451 is loaded into the latch 407, the data in the latch 410 (this has been set to the maximum value of X direction upon VSYNC) is compared with the content of the comparator 409 to decide which is greater than the other. If the data in the latch 407 is smaller, then the data in the latch 407 is loaded into a latch 410. At this time, the content of the subscan counter 452 is loaded into the latch 411, which operation is completed before the next eight bits are inputted into the shift register 401. The above-described operation for the latches 407 and 410 may be performed for the entire area of image, with the result that the latch 410 holds the minimum value of the X direction of the original and the coordinate of Y direction at that time is left in the latch 411. Since the main scan counter 451 is a down counter, the coordinate that corresponds to the X direction indicates the coordinate most distant from SP in the main scan. This most distant coordinate is P3(X3, Y3).

A flip flop 412 is a flip flop that is set when the first eight-bits-white appears in each of the main scan lines. The flip flop 412 is reset by the horizontal synchronizing signal HSYNC and is set upon the first eight-bits-white and remains set until the next HSYNC comes in. When the flip flop 412 is set, the latch 413 is set the content of the main scan counter that corresponds to the position of the first white signal in one main scan line. The content of latch 415 is compared with that in the latch 416. The latch 415 is set the minimum value "0" in the X direction at tee time when VSYNC is issued.

If the content of the latch 415 is equal to or smaller than the content of the latch 413, the signal 417 becomes active, causing the data of the latch 413 to be loaded into the latch 415. This operation is carried out during a time interval between a HSYNC and the next HSYNC.

The above-described operation for the latches 415 and 413 may be performed for the entire area of an image, with the result that the latch 415 holds the maximum value of the X coordinate of the original, i.e., the X coordinate of a white signal closest to the beginning point of the main scan is left in the latch 415. This is X2. When a signal is outputted onto the signal line 417, the subscan counter 452 outputs the content thereof to load it into a latch 418. This latched data is Y2. X2 and Y2 form P2(X2, Y2).

Over the whole image area, each time the eight-bits-white appears, the latches 419 and 420 are loaded the content of the main scan counter at that time and the content of the subscan counter at that time, respectively. This indicates that the count at the time when the eight-bits-white appears last is left in the counter if the original prescan has not completed yet. This is P4(X4, Y4).

The data lines of the above-described eight latches 406, 411, 420, 418, 405, 410, 415, and 419 are connected to the bus line of the CPU unit 508 in FIG. 1 so that the CPU unit 508 reads the data when the prescan completes.

Thus, the CPU unit 508 recognizes on the basis of the data the position or the size of original placed on the original support 201.

Figure 81:
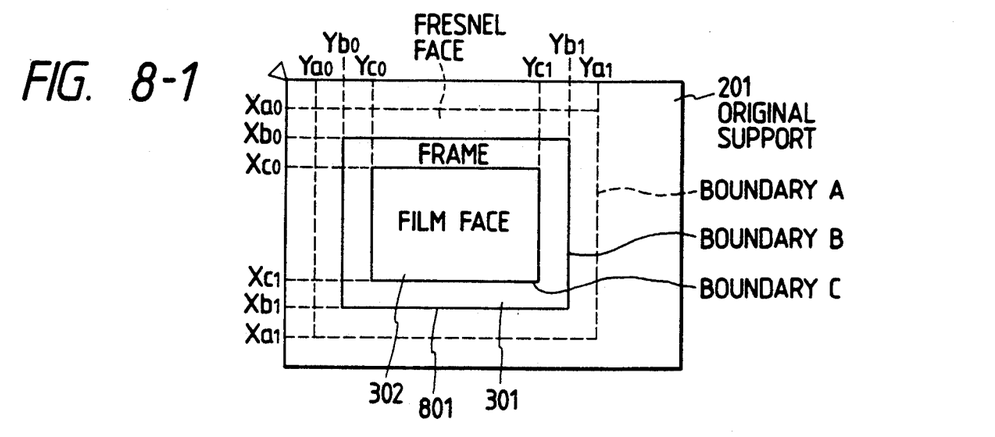
Figure 82:
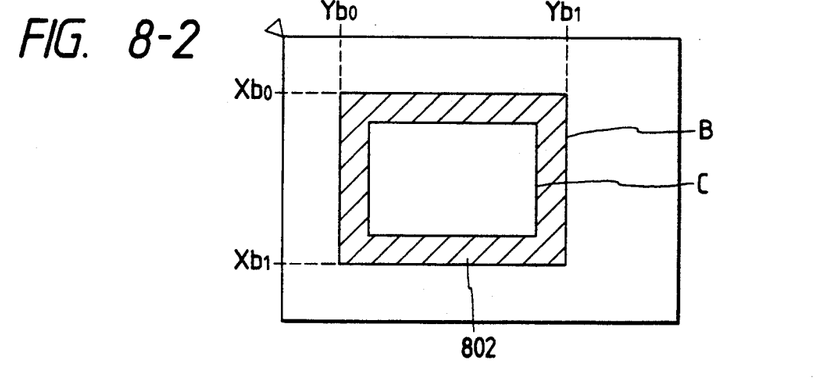
Figure 83:
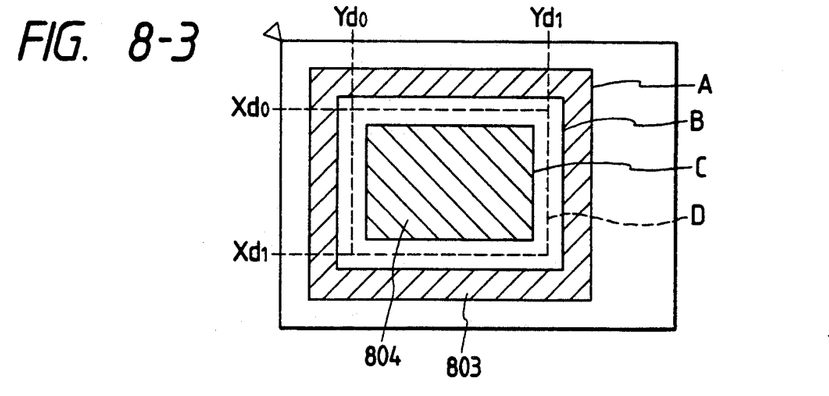

FIGS. 8-1 to 8-3 illustrate how the coordinate of the position of a frame-mounted light conductive original, such as a film-type frame-mounted OHP original, is detected.

As shown in FIGS. 8-1 to 8-3, the frame-mounted OHP film 801 is placed on the original support 201. The inner area of a boundary A is the projection of a backlight described in FIG. 2 and corresponds to the position and size of the Fresnel lens 102. A doughnut-like region between boundaries B and C is a frame 301 of an OHP film 801 placed within the size and position of the Fresnel lens while the inner area of the boundary C is the film surface 302. In such a case, with the exposing lamp 105 for the light conductive originals turned off and the exposing lamp 204 for the reflecting-originals turned on, detecting the coordinates of the original will result in coordinates $(X_{b0}, Y_{b0})$ and $(X_{b1}, Y_{b1})$ which are outside of the frame since the reflected light exists only in the area of frame portion between the boundaries B and C as depicted by a hatched portion 802 in FIG. 8-2. In the mean time, when the exposing lamp 105 for the light conductive originals is turned on and the exposing lamp 204 for the reflecting originals is turned off, the light passing through the original exists both in an area 803 which is defined by the boundaries A and B and in an area 804 on the inside of the boundary C i.e., film surface 302. Thus, detecting the coordinates of the original over the whole area of the original support 201 will result in coordinates $(X_{a0}, Y_{a0})$ and $(X_{a1}, Y_{a1})$, which are not correct coordinates of the film surface 302.

Assuming an area on the inside of a boundary D to be an coordinate detection area, which is defined by the coordinates $(X_{d0}, Y_{d0})$ and $(X_{d1}, Y_{d1})$ and somewhat inner than the outer coordinates $(X_{b0}, Y_{b0})$ and $(X_{b1}, Y_{b1})$ on the outside of the frame 301, will allow the detection of the coordinates $(X_{c0}, Y_{c0})$ and $(X_{c1}, Y_{c1})$ which correspond to the film surface 302. In order to perform the coordinate detection only on the inside of the boundary D, the image signal which is trimmed only the inside portion of the boundary D by the aforementioned trimming processing unit 506 can be supplied to the original position detecting unit 507 to detect the coordinates.

The procedure of detecting the coordinates of the original will now be described with reference to FIG. 9.

For the main scan, the image on the outside of the Fresnel plane is black-masked such that the coordinates of the frame 301 are detected. In order to trim only the inside of the Fresnel plane, coordinate ($X_{a0}$) is set to the ST counter 612 and ($X_{a1}$) to the EN counter 613 in FIG. 5, and a logic 1 is set to the control signal BB and a logic 0 to the signals IN and OF (step 900). Then, the lamp 105 is turned off and the lamp 204 is turned on (step 901) and the optical system begins to start to move (step 902). When the forward end $Y_{a0}$ of the Fresnel plane is reached (step 903), VSYNC is issued to start coordinate detection (step 904). When the rear end $Y_{a1}$ of the Fresnel plane is reached (step 905), the detection is over and the coordinates ($X_{b0}$, $Y_{b0}'$) and ($X_{b1}$, $Y_{b1}'$) held in the original detecting unit 507 are taken in (step 906). At this time, the latched values $Y_{b0}'$ and $Y_{b1}'$ of the respective subscan coordinates in FIG. 6 are added $Y_{a0}$ to produce the coordinates $Y_{b0}$ and $Y_{b1}$ with respect to the home position. Then, the optical system is stopped one time (step 907).

Then, to detect the coordinates of the film surface, the boundary D is determined from the coordinates of the frame 301 in the form of $X_{d0}=X_{b0}+\alpha x$, $X_{d1}=X_{b1}-\alpha x$, $Y_{d0}=Y_{b0}+\alpha y$, and $Y_{d1}=Y_{b1}-\alpha y$ (step 908). $\alpha x$ and $\alpha y$ are margin quantities that are determined experimentally.

With respect to the main scan direction, the ST counter 612 is set to $X_{d0}$, the EN counter 613 to $X_{d1}$ in FIG. 2 and the signal BB is set to a logic 1 and the signal IN and OF to a logic 0 such that the image on the outside of the boundary D is black.

Then, the lamp 105 is turned on and the lamp 204 is turned off (step 910) and the optical system begins to move rearwardly (step 911). When the rear end $Y_{d0}$ of the boundary D is reached (step 912), the coordinate detection is started (step 913). When the forward end $Y_{d0}$ of the boundary D is reached (step 914), the detection of coordinate completes and the coordinates ($X_{c0}$, $Y_{c0}$) and ($X_{c1}$, $Y_{c1}$) held in the original position detecting unit 507 are read in (step 915). It should be noted that the scan operation for the detection starts from the coordinate $Y_{d1}$ in the reverse direction.

Then, when the optical system returns to the home position (step 916), the lamps 105 and 204 are turned off (step 917) and waits for the next operation. The step 906 may be designed to make a decision such that the original has no frame if $X_{b0} \geq X_{b1}$ or $X_{b0} \geq Y_{b1}$.

In the manner described above, the position and size of frame of the frame-mounted OHP film, and the size and position of the film surface can be detected accurately.

Figure 9:
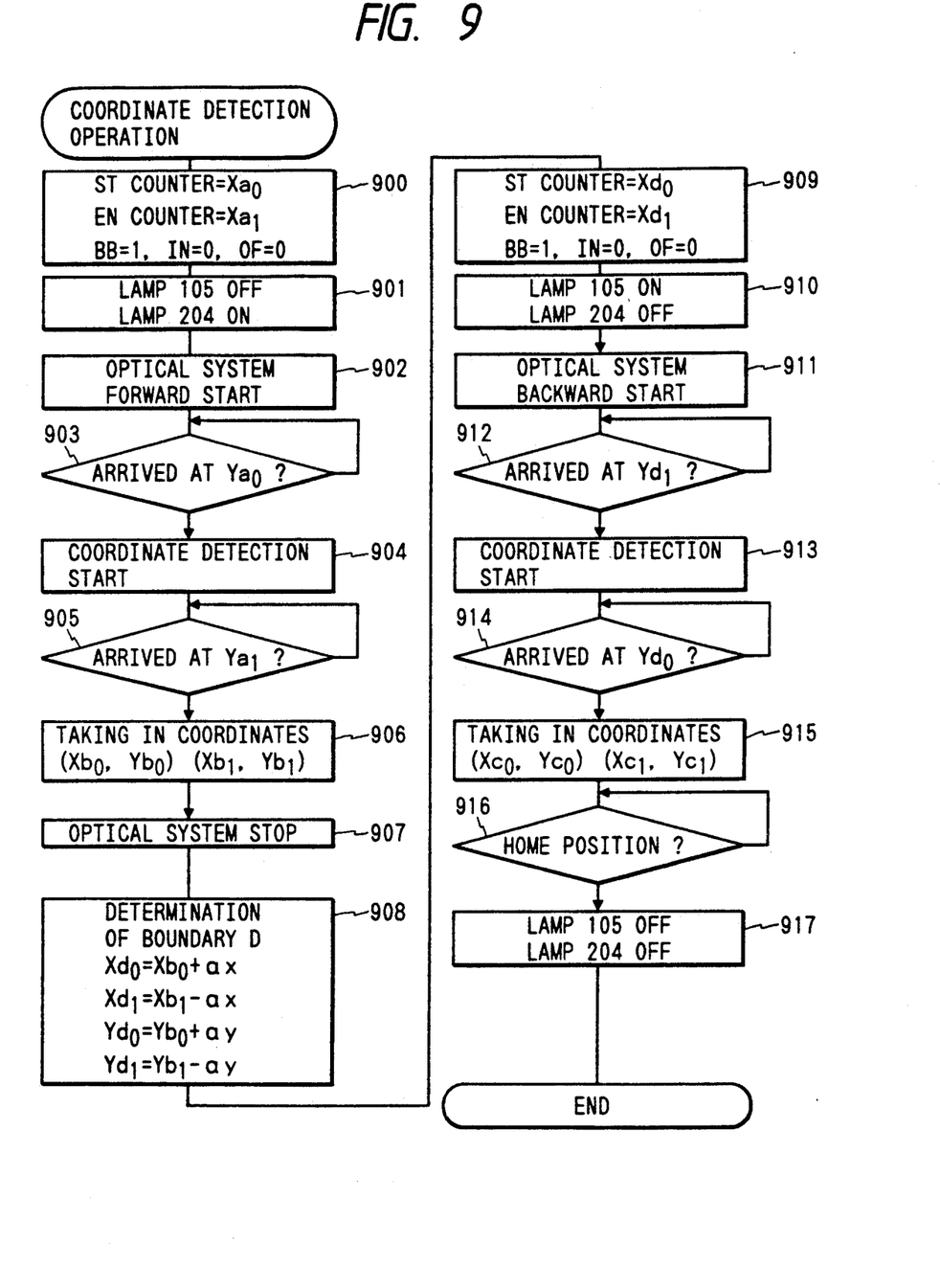
FIG. 9 is a flowchart showing steps of detecting the coordinates of the original.
Figure 10:
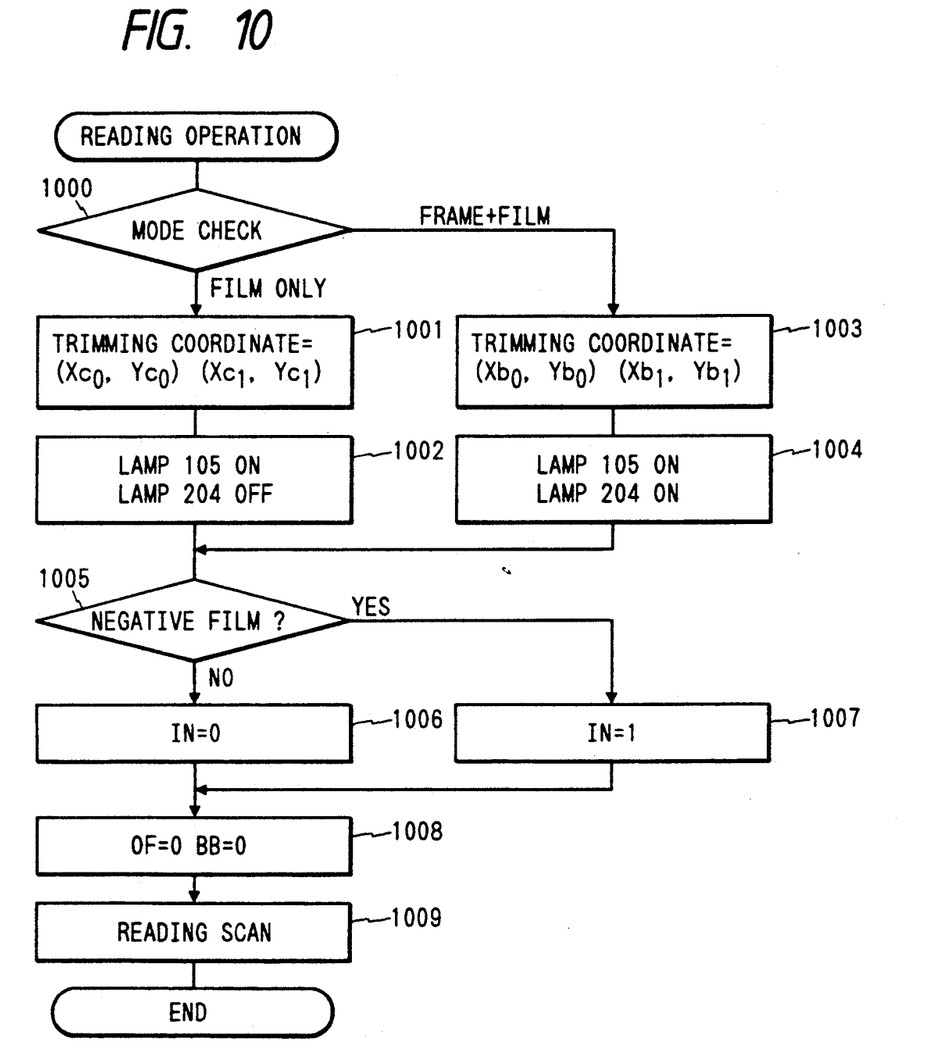
FIG. 10 is a flowchart of steps of reading the original.

FIG. 10 shows the control procedure of reading the frame-mounted OHP film which is detected by the CPU unit 508 through the steps in FIG. 9.

FIG. 10 shows only a portion specific to the present invention.

When reading the original, the operator selects mode whether the information on the frame 301 is to be read or not (step 1000). If the image only on the film surface 302 is to be read, the film portion coordinates ($Y_{c0}$, $Y_{c0}$) and ($X_{c1}$, $Y_{c1}$) detected through the steps in FIG. 9 are set as trimming coordinates (step 1001) and then the lamp 105 for the light conductive originals is turned on and the lamp 204 for the reflecting originals is turned off (step 1002).

If the image of the film surface 302 and the information on the frame 301 are both to be read, the coordinates of the frame ($X_{b0}$, $Y_{b0}$), ($X_{b1}$, $Y_{b1}$) are set as the trimming coordinates and the lamps 105 and 204 are both turned on (step 1004).

Then, in the mode selected by the operation unit 510, a decision is made based on whether the light conductive original is a negative film or not (step 1005). If it is a large negative film, the control signal IN in FIG. 5 is set to a logic 1 to invert the image, the black portion to white and white portion to black (step 1007).

The control signals OF and BB are both set to a logic 0 (step 1008), and the aforementioned reading operation is performed (step 1009).

In this manner, it is possible to accurately read only the film surface of the frame-mounted OHP film or to simultaneously and accurately read both the film and frame. It is also possible to read only the frame by setting the trimming area in accordance with the frame position.

It should be noted that some OHP films prepared as originals for presentation or the like have very low light conductivity.

The detection of coordinates described previously is carried out using the light through the film, emanated from the lamp 105 of the projector 107. Thus, when the OHP films having low light conductivities are used, the border between the frame portion and the film surface may possibly be detected inaccurately.

Figure 111:
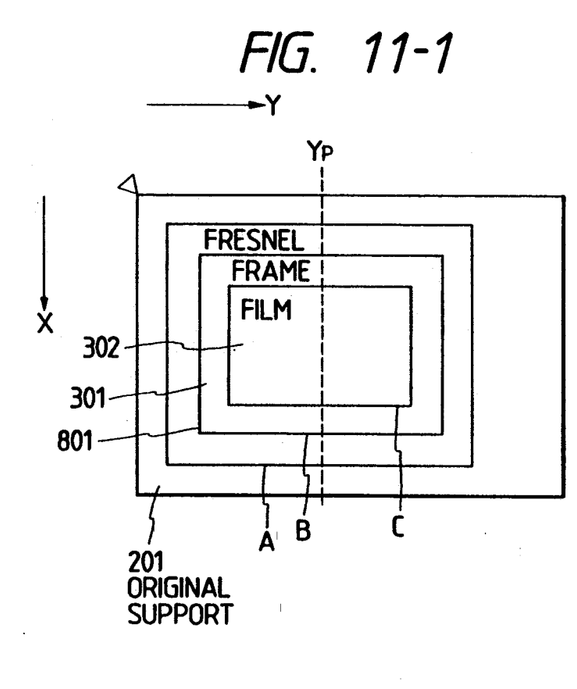
Figure 112:
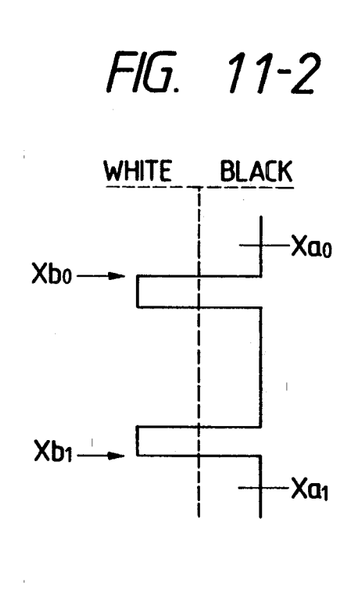
Figure 113:
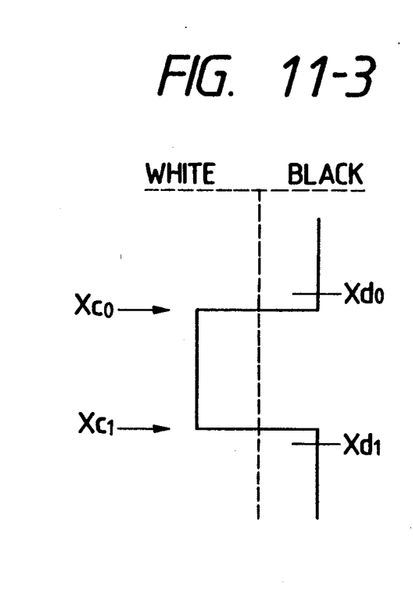

A second embodiment will now be described with reference to FIGS. 11-1 to 11-3 where the detection of coordinates of the film surface is also carried out by the reflected light.

FIG. 11-1 shows a frame-mounted OHP film 801 placed on the original support 201 as in FIG. 8(1). At a position $Y_p$ in the subscan, FIGS. 11(1) and 11(2) show the digitized image signal which is inputted into the original position detecting unit 507 shown in FIG. 6.

FIG. 11-2 shows the coordinates of the frame portion 301 is detected as in the first embodiment. The outside of the main scan coordinates $X_{a0}$ and $X_{a1}$ is forcibly set to a black signal by the circuit in FIG. 5. The reflected light of the lamp 204 for the reflecting originals exists only in the frame portion 301 between the coordinates $X_{a0}$ and $X_{a1}$. Thus, as shown, there exist two belts of a white signal in one main scan line. The original position detecting unit 507 detects the coordinate $X_{b0}$ and $X_{b1}$ at the two ends of this white signal.

FIG. 11-3 shows the black and white portions of the image signal, inputted into the original position detecting unit 507, inverted by the EX-OR gate 609 by setting the control signal IN in FIG. 5 to a logic 1 so as to detect the coordinates of the film surface 302 on the basis of the reflected light from the lamp 204.

The outside of the coordinates $X_{d0}$ and $X_{d1}$ which are slightly inside the coordinates of the two ends $X_{b0}$ and $X_{b1}$ of the frame portion 301, is forcibly set to black by the circuit in FIG. 5. Only the frame portion that can reflect light is of the black signal between the coordinates $X_{d0}$ and $X_{d1}$ and the film surface is of the white signal.

Figure 6:
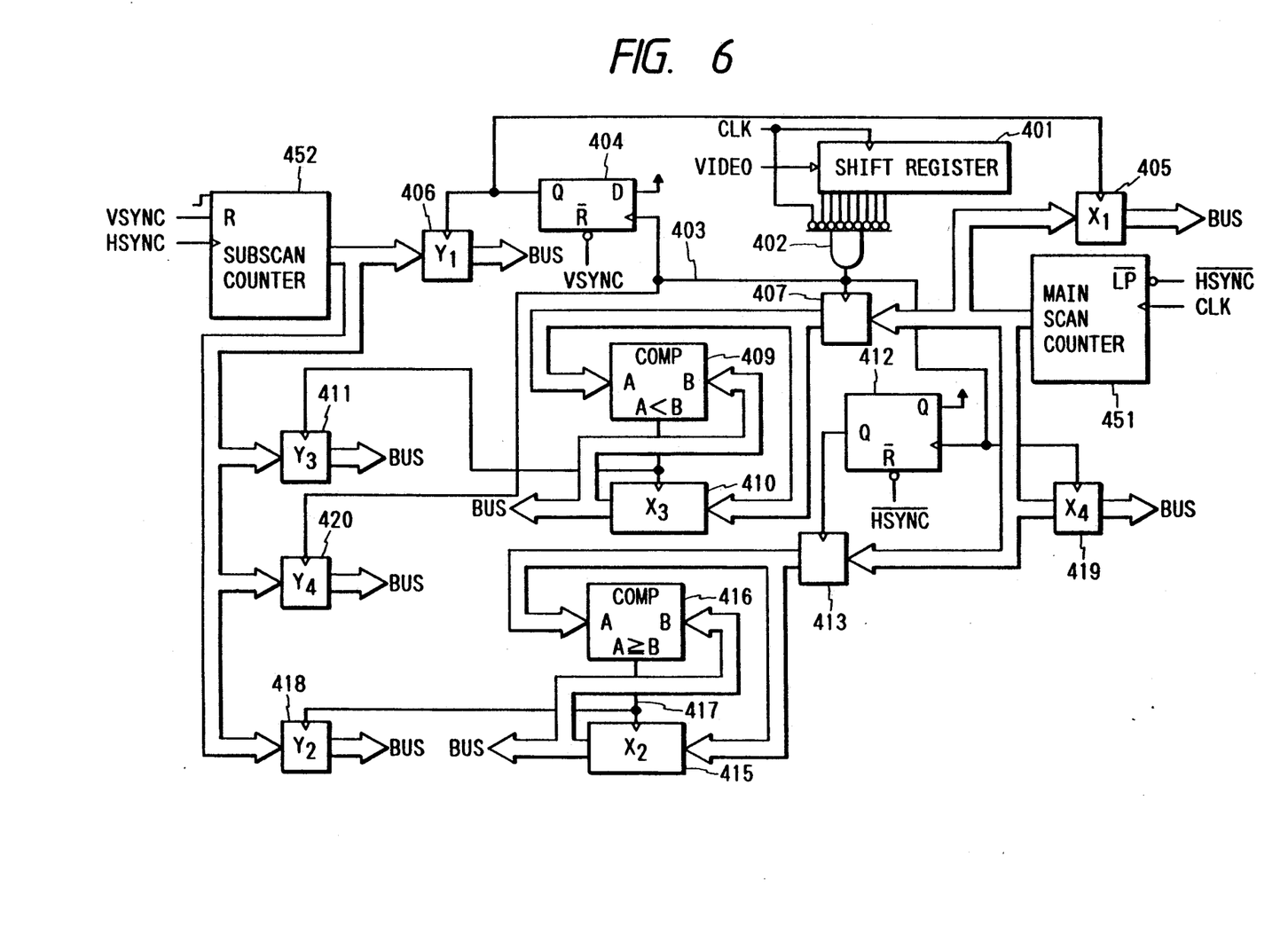
FIG. 6 is a circuit diagram showing an original-position detection unit.
Figure 7:
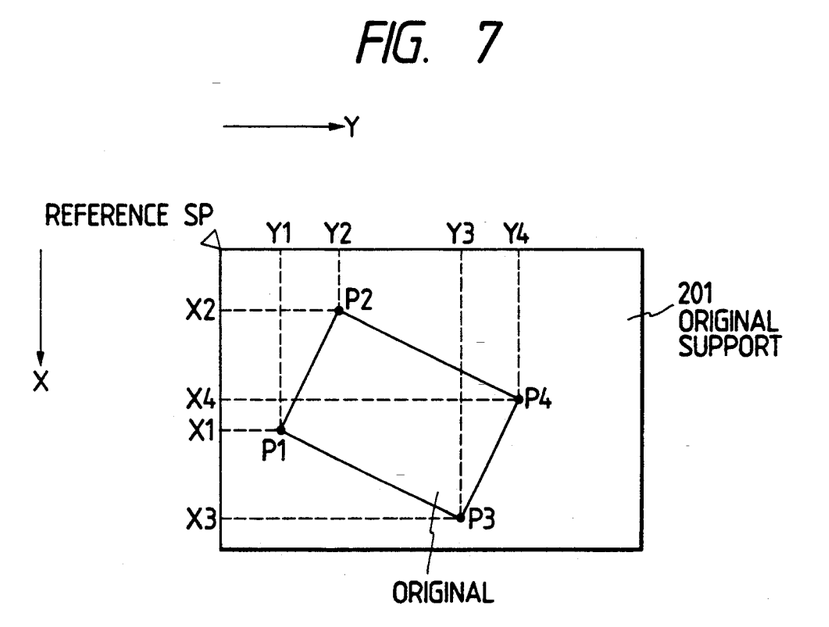
FIG. 7 is a diagram showing an original placed on an original support.

Thus, the original position detecting unit 507 in FIG. 6 detects the coordinates $X_{c0}$ and $X_{c1}$ of the film surface 302.

Figure 12:
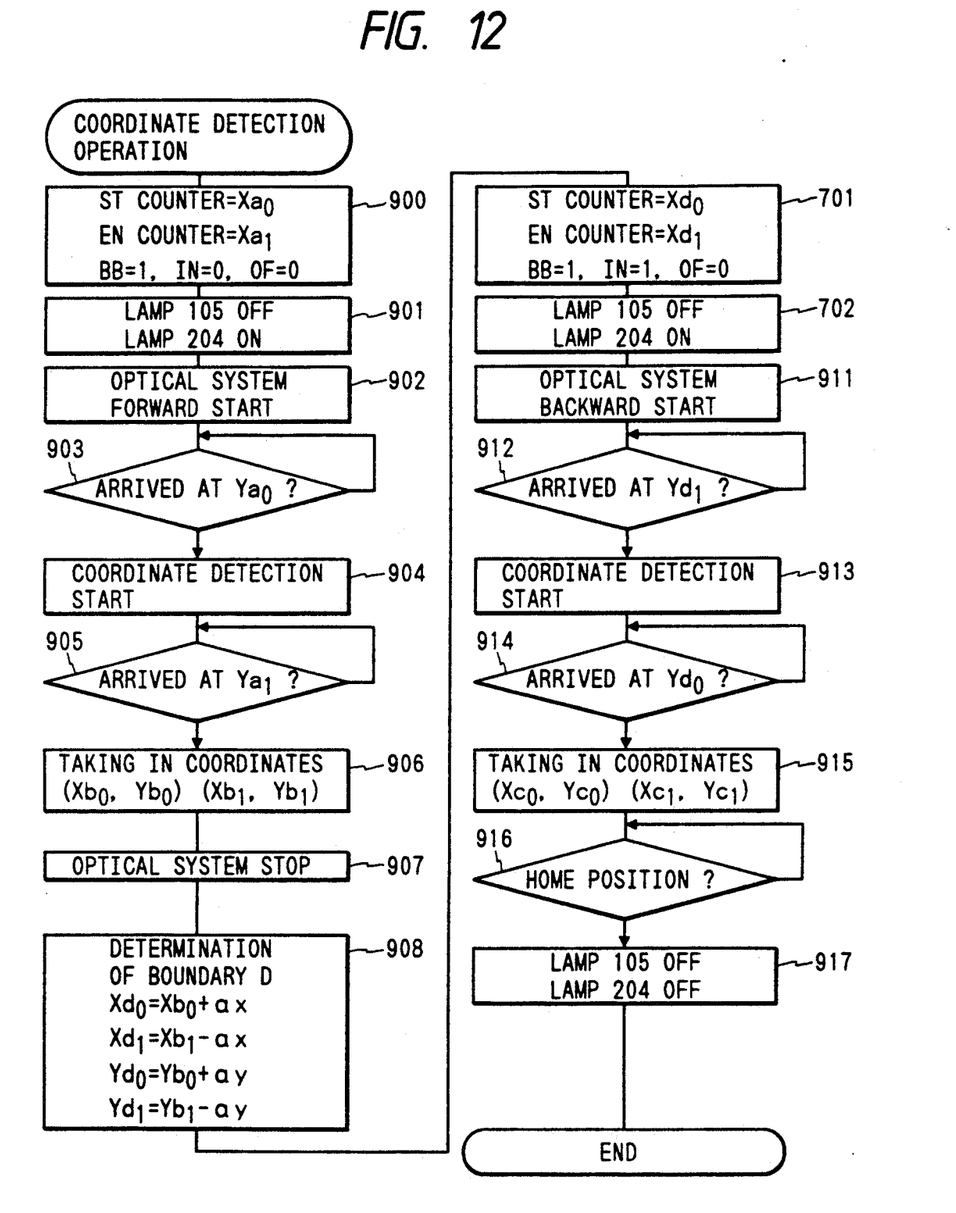
FIG. 12 is a flowchart of steps of detecting the coordinates of the original.

FIG. 12 shows the coordinates detecting operation of the second embodiment. Steps 900-908 and steps 911-917 are exactly the same as those in FIG. 9 and the description thereof is omitted.

At step 701, unlike the first embodiment, the control signal IN is set to a logic 1 in order to detect the coordinates of the film surface by means of the reflected light from the lamp 204. At step 702, for the same reason as in the first embodiment, the lamp 204 for the reflecting originals is turned on and the lamp 105 for the light conductive originals is turned off.

In the manner described above, the coordinates of the frame portion of the frame-mounted OHP film and the coordinates of the film portion can be independently detected only on the basis of the reflected light, permitting to read the originals at accurate positions.

As described above, the present invention is capable of detecting the frame portion and the light conductive portion of a frame-mounted light conductive original, respectively, it is possible to reliably read not only the image portion of the light conductive portion but also the image portion plus frame portion.

Although the present invention has been described with respect to the preferred embodiments, they are only exemplary and a variety of modifications may be made within the scope of the invention.

What is claimed is:

1. An original-reading apparatus comprising:
   an original support on which an original is placed;
   a first light source for exposing a reflecting portion of an original placed on said original support;
   a second light source for exposing a light conductive portion of the original placed on said original support;
   reading means for optoelectrically performing an original-reading operation to output an image signal by reading a light image reflected from the reflecting and light conductive portions of the original;
   detecting means for detecting positions of the reflecting portion and the light conductive portion both on the same original which is placed on said original support to output a position detection signal; and
   control means for controlling an image area to be read by said reading means in accordance with the position detection signal.

2. An original-reading apparatus according to claim 1, wherein said control means determines either the reflecting portion or the light conductive portion or both as the image area to be read.

3. An original-reading apparatus according to claim 1, wherein said detecting means detects the positions of the reflecting portion and the light conductive portion in accordance with the image signal from said reading means.

4. An original-reading apparatus according to claim 1, wherein said reading means reads a frame portion of a frame-mounted film as a reflecting portion and a film portion of the frame-mounted film as a light conductive portion.

5. An original-reading apparatus according to claim 1, wherein said detecting means detects the position of the reflecting portion when said first light source lights up, and detects the position of the light conductive portion when said second light source lights up.

6. An original-reading apparatus comprising:
   an original support on which an original is placed;
   a first light source for exposing a reflecting original placed on said original support;
   a second light source for exposing a light conductive original placed on said original support;
   reading means for optoelectrically performing an original-reading operation by reading a light image reflected from the reflecting original and light image passing through the light conductive original to output an image signal;
   setting means for setting either a first mode to read the reflecting original or a second mode to read both the reflecting original and the light conductive original; and
   control means for controlling said first and second light sources so that said first light source lights up when the first mode is set by said setting means and said first and second light sources simultaneously light up when the second mode is set by said setting means.

7. An original-reading apparatus according to claim 6, wherein said reading means reads a frame portion of a frame-mounted film as a reflecting original and a film portion of the frame-mounted film as a light conductive original when the second mode is set.

8. An original-reading apparatus according to claim 6, wherein said apparatus further includes detecting means for detecting a position of the reflecting original and the light conductive original placed on said original support.

9. An original-reading apparatus according to claim 8, wherein said detecting means detects the position of the reflecting portion when said first light source lights up, and detects the position of the light conductive original when said second light source lights up.

10. An original-reading apparatus according to claim 8, wherein said detecting means detects the position of the reflecting original and the light conductive original in accordance with the image signal from said reading means.

11. An original-reading apparatus comprising:
    an original support on which an original is placed;
    a first light source for exposing a reflecting portion of the original placed on said original support;
    a second light source for exposing a light conductive portion of the original placed on said original support;
    reading means for optoelectrically performing an original-reading operation to output an image signal by reading a light image reflected form the reflecting portion and a light passing through the light conductive portion;
    detecting means for detecting a position of the reflecting portion of the original when said first light source lights up, and for detecting a position of the light conductive portion of the original when said second light source lights up; and
    control means for controlling an image area to be read by said reading means in accordance with a position detection result of said detecting means.

12. An original-reading apparatus according to claim 11, wherein said detecting means detects the position of the reflecting portion and the light conductive portion in accordance with said image signal from said reading means.

13. An original-reading apparatus according to claim 11, wherein said reading means reads a frame portion of a frame-mounted film as a reflecting portion and a film portion of the frame-mounted film as a light conductive portion.

14. An original-reading apparatus according to claim 11, wherein said apparatus further includes light control means for causing said first and second light sources to light up simultaneously when the original having both reflecting and light conductive portions is read.

15. An original-reading apparatus comprising:

an original support on which an original is placed;

a first light source for exposing a frame portion of a frame-mounted film placed on said original support;

a second light source for exposing a film portion of the frame-mounted film placed on said original support;

reading means for optoelectrically performing an original-reading operation to output an image signal by reading a first light image received from the frame portion of the frame-mounted film and a second light image received form the film portion of the frame-mounted film;

detecting means for detecting positions of the frame portion and the film portion of the frame-mounted film on said original support; and control means for controlling an image area to be read by said reading means in accordance with the result of detection by said detection means.

16. An original-reading apparatus according to claim 15, wherein said control means causes said reading means to read either an image on the film portion or an image on the film and frame portions.

17. An original-reading apparatus according to claim 15, wherein said reading means reads a frame portion and a film portion of the frame-mounted film when said first and second light sources light up simultaneously.

18. An original-reading apparatus according to claim 15, wherein said detecting means detects the position of the frame portion when said first light source lights up and detects the position of the film portion when said second light source lights up.

* * * * *

UNITED STATES PATENT AND TRADEMARK OFFICE
CERTIFICATE OF CORRECTION

PATENT NO. : 5,282,064
DATED : January 25, 1994
INVENTOR(S) : MASANORI YAMADA

It is certified that error appears in the above-identified patent and that said Letters Patent is hereby corrected as shown below:

COLUMN 1

Line 54, "is adjusted its focus" should read --is adjusted for focus--.

COLUMN 2

Line 64, "diagram" should read --diagrams--.

COLUMN 5

Line 64, "tee" should read --the--.

COLUMN 6

Line 60, "an" should read --a--.
Line 68, "only" should read --only on--.

COLUMN 7

Line 62, "selects" should read --selects the--.

UNITED STATES PATENT AND TRADEMARK OFFICE
CERTIFICATE OF CORRECTION

PATENT NO. : 5,282,064
DATED : January 25, 1994
INVENTOR(S) : MASANORI YAMADA

It is certified that error appears in the above-identified patent and that said Letters Patent is hereby corrected as shown below:

COLUMN 10

Line 5, "and" should read --and a--.
Line 32, "original" should read --portion--.
Line 48, "form" should read --from--.

Signed and Sealed this

First Day of November, 1994

Attest:

Attesting Officer

BRUCE LEHMAN

Commissioner of Patents and Trademarks